United States Patent

Tsukamoto et al.

Patent Number: 6,124,043
Date of Patent: Sep. 26, 2000

[54] BIAXIALLY ORIENTED FILM

[75] Inventors: Ryoji Tsukamoto; Seiji Ito; Mitsuru Teramoto, all of Matsuyama; Shinya Watanabe, Sagamihara; Koji Furuya, Sagamihara; Shinichi Kawai, Sagamihara; Kenji Suzuki, Sagamihara, all of Japan

[73] Assignee: Teijin Limited, Osaka, Japan

[21] Appl. No.: 09/331,848

[22] PCT Filed: Oct. 28, 1998

[86] PCT No.: PCT/JP98/04871

§ 371 Date: Jun. 28, 1999

§ 102(e) Date: Jun. 28, 1999

[87] PCT Pub. No.: WO99/21912

PCT Pub. Date: May 6, 1999

[30] Foreign Application Priority Data

Oct. 29, 1997 [JP] Japan .................................. 9-296897
Jan. 9, 1998 [JP] Japan .................................. 10-003178
Mar. 10, 1998 [JP] Japan .................................. 10-058150
Apr. 15, 1998 [JP] Japan .................................. 10-104665

[51] Int. Cl.[7] ............................. B32B 27/06; G03C 1/76; C08G 63/18
[52] U.S. Cl. ........................ 428/480; 528/298; 528/300; 528/301; 528/302; 528/308; 525/437; 525/444; 430/533; 430/627; 428/900; 428/902
[58] Field of Search ..................... 528/298, 300, 528/301, 302, 308; 525/437, 444; 430/533, 627; 428/480, 900, 902

[56] References Cited

U.S. PATENT DOCUMENTS

| | | |
|---|---|---|
| 4,732,799 | 3/1988 | Sakamoto et al. .......................... 428/141 |
| 4,804,736 | 2/1989 | Utsumi ...................................... 528/176 |
| 4,812,360 | 3/1989 | Utsumi ...................................... 428/337 |
| 5,556,712 | 9/1996 | Kimura et al. ............................ 428/480 |
| 5,703,283 | 12/1997 | McClish et al. ........................... 73/116 |
| 5,753,172 | 5/1998 | Forrest, Jr. et al. ...................... 264/481 |
| 5,759,467 | 6/1998 | Carter et al. .......................... 264/173.12 |
| 5,885,501 | 3/1999 | Gardner et al. ........................... 264/216 |

FOREIGN PATENT DOCUMENTS

| | | |
|---|---|---|
| 48-40414 | 11/1973 | Japan . |
| 50-109715 | 8/1975 | Japan . |
| 53-146773 | 12/1978 | Japan . |
| 1-244446 | 9/1989 | Japan . |
| 4-500982 | 2/1992 | Japan . |
| 5-212786 | 8/1993 | Japan . |
| 8-92390 | 4/1996 | Japan . |

*Primary Examiner*—Samuel A. Acquah
*Attorney, Agent, or Firm*—Sughrue, Mion, Zinn, Macpeak & Seas, PLLC

[57] ABSTRACT

A biaxially oriented film (1) which is substantially formed from a polyethylene naphthalate copolymer comprising ethylene-2,6-naphthalate units in an amount of 90 to 99.9 mol % based on the total of all recurring units and an isophthalic acid component or a decalin-2,6-dicarboxylic acid component in an amount of 0.1 to 10 mol % based on the total of all dicarboxylic acid components and which has (2) Young's modulus of 500 kg/mm$^2$ or more in each of a longitudinal direction and a transverse direction, (3) a plane orientation coefficient of 0.230 to 0.275 and (4) a density of 1.350 g/cm$^3$ or more.

26 Claims, No Drawings

BIAXIALLY ORIENTED FILM

TECHNICAL FIELD

The present invention relates to a biaxially oriented film formed from a polyethylene naphthalate copolymer. More specifically, it relates to a biaxially oriented film useful as a base film for a magnetic recording medium or photo film.

BACKGROUND ART

Polyesters typified by polyethylene terephthalate are now widely used in such application fields as fibers, films and molded articles on account of their excellent physical and chemical properties. Especially, in the field of magnetic recording media which have been making remarkable progress these days, such as audio tapes, video tapes, computer tapes and floppy disks, a biaxially oriented film of polyethylene terephthalate is advantageously used as a base film.

However, along with a recent tendency to reduce the size and weight of electric and electronic equipment and to improve performance thereof, properties required for a base film having been becoming increasingly restricted. For instance, in the field of magnetic recording media, a base film must be thin to realize long-time recording and reductions in size and weight. At the same time, it is important to retain the stiffness of a film by improving elastic modulus. Therefore, it has been found in some cases that an extremely thin base film formed from conventional polyethylene terephthalate is unsatisfactory in terms of elastic modulus.

In contrast to the film formed from polyethylene terephthalate (to be referred to as "PET film" hereinafter), a film formed from polyethylene-2,6-naphthalate (to be referred to as "PEN film" hereinafter) has excellent mechanical properties, heat resistance, chemical properties and high Tg and is preferably used in the above application fields. However, the PEN film has a lower tear strength (lower delamination resistance) than an ordinary PET film. Particularly when it is stretched like a biaxially oriented film, the tear strength of an intermediate or final product in the process of molding is low in many cases. Therefore, the film is broken so frequently that a product cannot be obtained, for example, in the production process of a sequentially biaxially oriented film of polyethylene-2,6-naphthalate, or even if a product is obtained, a film which is readily torn in a specific direction is obtained.

Meanwhile, a triacetate film has been used as a base film for a photo film. This triacetate film involves safety and environmental problems because an organic solvent is used in its production process. In addition, it has limits in mechanical strength and dimensional stability. Therefore, a PET film has started to be used in part of the application fields of this triacetate film as a substitute base film. However, when kept in the form of a roll and unrolled, this PET film remains curled and this curl is difficult to remove. Therefore, the PEN film shows low handling properties after developed, thereby making it difficult to use it for a photo film which is used as a rolled film.

As a technology for improving the anti-curling property of this PET film, JP-A 53-146773 and JP-A 1-244446 propose films which are formed from modified polyethylene terephthalate to improve, for example, steam permeability and moisture content. Although the effect of improving anti-curling property is observed in these films, moisture absorption causes a reduction in dimensional stability and a reduction in glass transition temperature, which in turn increase the deformation of the end portions of the films. Therefore, they are unsatisfactory as a base film for a photo film.

Further, a demand for a photo film of higher quality has recently arisen. For instance, attempts are being made to increase the winding speed of a rolled film at the time of photographing and to reduce the size of a photographing device. The film is demanded to show excellent anti-curling property even when rolled to a very small diameter and excellent mechanical strength and dimensional stability when reduced in thickness. Both the above triacetate film and the modified polyethylene terephthalate film cannot meet these requirements perfectly and a base film for a photo film having excellent characteristic properties is desired accordingly.

To meet this demand, the application of a PEN film to a photo film is disclosed by JP-B 48-40414 and JP-A 50-109715, for example. These PEN films are satisfactory to some extent in adaptability of thickness reduction such as mechanical strength and dimensional stability and in anti-curling property when rolled to a small diameter. However, the PEN film is susceptible to delamination, especially when the film is rolled and perforated. The occurrence of delamination makes it difficult to use it as a base film of a photo film because a delaminated portion is whitened.

Problems that the Invention Tries to Solve

As described above, although the PEN film has excellent properties as a base film for a magnetic recording medium or for a photo film, it still has problems to be solved as a base film to be used for these two application purposes.

It is therefore the first object of the present invention to provide a biaxially oriented film which is formed from modified polyethylene naphthalate and which has better characteristic properties than a conventional PEN film when used as a base film for a magnetic recording medium or for a photo film.

It is the second object of the present invention to provide a biaxially oriented film which is formed from modified polyethylene naphthalate and which has improved delamination resistance while retaining the physical properties of a PEN film.

It is the third object of the present invention to provide a biaxially oriented film which is used as a base film for a magnetic recording medium and which has higher delamination resistance than a PEN film while retaining the high elastic modulus of the PEN film.

It is another object of the present invention to provide a biaxially oriented film which is used as a base film for a photo film and which has higher anti-curling property than a PEN film while retaining the physical properties, hue and transparency of the PEN film.

Means for Solving the Problem

According to studies conducted by the inventors of the present invention, the above objects of the present invention are attained by a biaxially oriented film (1) which is substantially formed from a polyethylene naphthalate copolymer comprising ethylene-2,6-naphthalate units in an amount of 90 to 99.9 mol % based on the total of all recurring units and an isophthalic acid component or a decalin-2,6-dicarboxylic acid component in an amount of 0.1 to 10 mol % based on the total of all dicarboxylic acid components and which has (2) Young's modulus of 500 kg/mm$^2$ or more in each of a longitudinal direction and a transverse direction, (3) a plane orientation coefficient of 0.230 to 0.275 and (4) a density of 1,350 g/cm$^3$ or more.

A detailed description is subsequently given of the biaxially oriented film of the present invention.

The polyethylene naphthalate copolymer forming the biaxially oriented film of the present invention comprises ethylene-2,6-naphthalate units in an amount of 90 to 99.9 mol % based on the total of all recurring units and an isophthalic acid component or a decalin-2,6-dicarboxylic acid component as a copolymer component in an amount of 0.1 to 10 mol % based on the total of all dicarboxylic acid components.

In the present invention, the polyethylene naphthalate copolymer may be sometimes abbreviated as "modified PEN" and a film of the copolymer may be sometimes referred to as "modified PEN film.

In the present invention, the main dicarboxylic acid component constituting the modified PEN is 2,6-naphthalenedicarboxylic acid and the main glycol component is ethylene glycol. The modified PEN comprises an isophthalic acid component or a decalin-2,6-dicarboxylic acid component as a copolymer component in an amount of 0.1 to 10 mol %, preferably 0.5 to 8 mol %, based on the total of all dicarboxylic acid components.

The isophthalic acid component as a copolymer component is used as isophthalic acid or a lower alkyl ester thereof in the production of the modified PEN. The lower alkyl ester is preferably an ester of a lower alcohol having 1 to 5 carbon atoms, such as methanol, ethanol, propanol or butanol. The isophthalic acid component is preferably isophthalic acid or dimethyl isophthalate.

The decalin-2,6-dicarboxylic acid component as a copolymer component is used as decalin-2,6-dicarboxylic acid or a lower alkyl ester thereof in the production of the modified PEN. The lower alkyl ester is the same as that described with regard to the above isophthalic acid component. The decalin-2,6-dicarboxylic acid component is preferably decalin-2,6-dicarboxylic acid or a dimethyl ester thereof.

The decalin-2,6-dicarboxylic acid component may take a cis-cis form, cis-trans form, trans-trans form or a mixture of these.

As described above, the modified PEN in the present invention comprises 2,6-naphthalenedicarboxylic acid as the main dicarboxylic acid component and ethylene glycol as the main glycol component.

The main dicarboxylic acid component is a component which is contained in an amount of 80 mol % or more, preferably 90 mol % or more, based on the total weight of all dicarboxylic acid components and the main glycol component is a component which is contained in an amount of 80 mol % or more, preferably 90 mol % or more, based on the total weight of all glycol components.

The modified PEN in the present intention preferably contains a diethylene glycol component in an amount of 3 mol % or less.

If the amount of the diethylene glycol component is larger than 3 mol %, its effect of improving the delamination resistance of the resulting film is increased whereas crystallinity is lost with the result that mechanical strength is greatly reduced.

The diethylene glycol component is by-produced and copolymerized in the process of producing a polyethylene naphthalate copolymer. There must be selected a polymerization method and conditions which ensure that the amount of the diethylene glycol component does not exceed 3 mol %. The smaller the amount of the diethylene glycol component is the more preferable it is. It is preferably 2.5 mol % or less, particularly preferably 2 mol % or less. To suppress the by-production of diethylene glycol during the production of the modified PEN, it is preferable to control the amount of diethylene glycol to 2.0 to 3.0 moles per mole of the total of all dicarboxylic acid components. It is advantageous to make the time required for an ester interchange reaction as short as possible.

The modified PEN in the present invention may contain other copolymer components in addition to the isophthalic acid component or the decalin-2,6-dicarboxylic acid component as a copolymer component. In this case, it is desired that such copolymer components be effective in preventing delamination without reducing Young's moduli greatly. The total amount of the copolymer components other than diethylene glycol is 3 mol % or less, preferably 1 mol % or less, more preferably 0.1 mol % or less.

Illustrative examples of the above other copolymer components include compounds having two ester-forming functional groups, such as oxalic acid, adipic acid, phthalic acid, sebacic acid, dodecanedicarboxylic acid, succinic acid, isophthalic acid, 5-sodium sulfoisophthalic acid, terephthalic acid, 2-potassium sulfoterephthalic acid, 2,7-naphthalenedicarboxylic acid, 1,4-cyclohexanedicarboxylic acid, 4,4'-diphenyldicarboxylic acid, phenylindanedicarboxylic acid, diphenyl ether dicarboxylic acid and lower alkyl esters of these compounds; oxycarboxylic acids such as p-oxyethoxybenzoic acid and lower alkyl esters thereof; propylene glycol, 1,2-propanediol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, p-xylylene glycol, bisphenol A adduct with ethylene oxide, bisphenol sulfone adduct with ethylene oxide, triethylene glycol, polytetramethylene oxide glycol, neopentyl glycol and other compounds.

The modified PEN of the present invention may have terminal hydroxide groups and/or carboxyl groups, part or all of which are terminated with a monofunctional component such as benzoic acid, or it may be modified to such an extent that a substantially linear polymer can be obtained by a trace amount of an ester-forming compound having 3 or more functional groups, such as glycerin or pentaerythritol.

The modified PEN of the present invention has a solid viscosity of preferably 0.40 to 0.90, more preferably 0.45 to 0.70, particularly preferably 0.48 to 0.68.

Additives

The modified PEN of the present invention may contain such additives as dye, pigment, stabilizer, lubricant, ultraviolet absorber and flame retardant as desired.

The modified PEN of the present invention can be produced by subjecting dicarboxylic acid components containing the above naphthalene-2,6-dicarboxylic acid and/or the lower alkyl ester thereof as the main dicarboxylic acid component(s), glycol components containing ethylene glycol as the main glycol component, and an isophthalic acid component or a decalin-2,6-dicarboxylic acid component as a copolymer component to a polycondensation reaction.

Preferably, the modified PEN is produced by subjecting dimethyl naphthalene-2,6-dicarboxylate, ethylene glycol and dimethyl isophthalate or dimethyl decalin-2,6-dicarboxylate to an ester interchange reaction and polycondensing the obtained reaction product. A film having a good hue and high transparency can be obtained from a copolyester produced by this method.

To produce the biaxially oriented film of the present invention, there may be used a conventional method known per se. For example, the biaxially oriented film of the present invention can be produced by melting the modified PEN, extruding it into a sheet, cooling the sheet by a cooling drum to obtain an unstretched film, biaxially stretching the unstretched film, heat-setting the stretched film, and as required, thermally relaxing the heat-set film. The surface properties, density and thermal shrinkage factor of the obtained film are changed by stretching conditions and other production conditions. Therefore, the biaxially oriented film of the present invention can be produced by selecting suitable conditions according to need.

For instance, in the above production method, the modified PEN is molten at a temperature of Tm+10° C. to Tm+40° C. (Tm is the melting point of a polyethylene naphthalate copolymer) and extruded to obtain an unstretched film, which is then stretched to 2 to 5 times in a monoaxial direction (breadthwise direction (or transverse direction) of the film or a direction perpendicular to this direction (longitudinal direction)) at a temperature of Tg−10° C. to Tg+50° C. (Tg is the glass transition temperature of the polyethylene naphthalate copolymer) and subsequently stretched to 2 to 5 times in a direction perpendicular to the above stretching direction (transverse direction if the film was first stretched in a longitudinal direction) at a temperature of Tg to Tg+50° C.

Thereafter, the film is preferably heat-set at a temperature of Tg+60° C. to Tg+130° C. for 0.2 to 20 seconds. If the heat-setting temperature and time are within the above ranges, there can be obtained a film having excellent delamination resistance and anti-curling property and high transparency.

According to the present invention, there can be obtained a biaxially oriented film having Young's moduli of 500 kg/mm$^2$ or more, or 550 kg/mm$^2$ or more under the optimum conditions, in both longitudinal (MD) and transverse (TD) directions. The upper limit of Young's modulus in a longitudinal direction is 800 kg/mm$^2$, preferably 750 kg/mm$^2$ and that in a transverse direction is 1,200 kg/mm$^2$. If Young's moduli are too high, delamination resistance becomes insufficient. Furthermore, the biaxially oriented film of the present invention has a plane orientation coefficient of 0.23 to 0.275. If the plane orientation coefficient is lower than this range, mechanical strength lowers. On the other hand, if it is higher than this range, delamination resistance deteriorates.

Further, the biaxially oriented film of the present invention has a density of 1.350 g/cm$^3$ or more. If the density is lower than this value, orientation crystallization becomes insufficient, mechanical strength deteriorates and delamination resistance becomes unsatisfactory. To keep the surface of the film flat, the density is desirably 1.362 g/cm$^3$ or less.

The biaxially oriented film of the present invention has excellent anti-curling property. The anti-curling property means that a film hardly remains curled when rolled once and then unrolled. That is, the biaxially oriented film of the present invention has anti-curling properties at 80° C. of 50 m$^{-1}$ or less in terms of ANSI curl value.

The biaxially oriented film of the present invention rarely has whitening at a fold when folded. Even if it does, the length or proportion of a whitened portion is small. This property is called "delamination resistance" and is an important index for the evaluation of both a base film for a magnetic recording medium and a base film for a photo film. This delamination resistance is expressed as folded-line delamination whitening width or folded-line delamination whitening ratio in the present invention. The biaxially oriented film of the present invention desirably has a folded-line delamination whitening ratio of 10% or less.

The biaxially oriented film of the present invention can be as thick as 0.5 to 250 μm. The thickness of the film has a preferable range according to the application purpose of the base film. That is, when the biaxially oriented film of the present invention is used as a base film for a magnetic recording medium, its thickness is 0.5 to 25 μm, preferably 1 to 25 μm. Meanwhile, when it is used as a base film for a photo film, its thickness is 25 to 250 μm, preferably 40 to 150 μm.

As described above, the biaxially oriented film substantially formed from the modified PEN of the present invention has excellent properties as a base film for a magnetic recording medium or for a photo film. The studies conducted by the present inventors have revealed that a film having more excellent properties can be provided as a base film for each of the above two application purposes. There will be described hereunder a particularly preferable embodiment of a biaxially oriented film for use as a base film for a magnetic recording medium or for a photo film.

That is, according to the present invention, there is provided a biaxially oriented film used as a base film for a magnetic recording medium, (1) which is substantially formed from a polyethylene naphthalate copolymer comprising ethylene-2,6-naphthalate units in an amount of 90 to 99.9 mol % based on the total of all recurring units and an isophthalic acid component or a decalin-2,6-dicarboxylic acid component in an amount of 0.1 to 10 mol % based on the total of all dicarboxylic acid components and which has (2) Young's modulus of 500 kg/mm$^2$ or more in each of a longitudinal direction and a transverse direction with the total of Young's moduli in both directions being 1,200 kg/mm$^2$ or more, (3) a plane orientation coefficient of 0.230 to 0.275, (4) a density of 1.350 g/cm$^3$ or more, and (5) a film surface roughness of 2.0 nm or less.

One of the features of the base film for a magnetic recording medium is that the base film has a surface roughness of 2.0 nm or less. If an adhesive layer, barrier layer or magnetic layer is coated or deposited on the base film having the surface roughness of more than 2.0 nm, the flatness of the film is impaired, thereby, for example, deteriorating electromagnetic conversion characteristics disadvantageously. Crystallization is appropriately hindered by the copolymerization of an isophthalic acid component or a decalin-2,6-dicarboxylic acid component to reduce surface roughness caused by the growth of fine crystals by heat-setting. To make the surface flatter, there are a method in which the heat-setting temperature is reduced to prevent crystallization from forming spots and a method in which the surface of a film is crystallized when a polymer extruded from a die is cooled by a casting drum. These methods are the most effective. In these methods, the temperature of the casting drum is maintained at 40 to 80° C. and cold water is poured onto the film on the casting drum to quench it. However, the present invention is not limited to these methods and any methods are acceptable as long as a film is cooled effectively.

Further, the above base film desirably has a density of coarse protrusions, having a height of 1.1 μm or more on the surface, of 5 or less per 100 cm$^2$. If the film having the density of the coarse protrusions of more than 5 per 100 cm$^2$ is used as a base film for a magnetic recording medium, it causes dropouts of a reproduced image. The number of the coarse protrusions formed by the unmolten product of the modified PEN can be reduced by setting the film extrusion temperature to a temperature higher than 300° C. The number of the coarse protrusions formed by an unmolten product such as dust contained in raw materials can be reduced by separating a molten polymer by a filter of small meshes.

The base film for a magnetic recording medium has Young's moduli of 500 kg/mm$^2$ or more, preferably 550 kg/mm$^2$ or more, in both longitudinal and transverse directions, and the total of Young's moduli in both directions is preferably 1,200 kg/mm$^2$ or more, more preferably 1,240 kg/mm$^2$ or more.

The total of Young's moduli is preferably 1,900 kg/mm$^2$ or less, more preferably 1,700 kg/mm$^2$ or less. If the total of Young's moduli is larger than 1,900 kg/mm², delamination resistance degrades.

In case of using the biaxially oriented film of the present invention as a base film for a magnetic recording medium, the modified PEN preferably comprises an isophthalic acid component in an amount of 0.5 to 8 mol %, particularly 1 to 7 mol %, or a decalin-2,6-dicarboxylic acid component in an amount of 1 to 8 mol %, particularly 1 to 7 mol %. Modified PEN comprising an isophthalic acid component is generally superior to one comprising a decalin-2,6-dicarboxylic acid component.

The base film for a magnetic recording medium may contain a small amount of inert particles to provide slipperiness to the film. Specific examples of the inert particles include inorganic particles such as spherical silica, porous silica, calcium carbonate, silica alumina, alumina, titanium dioxide, kaolin clay, barium sulfate and zeolite; and organic particles such as crosslinked silicone resin particles and crosslinked polystyrene particles. Synthetic inorganic particles are more preferable than natural inorganic particles because they are uniform in size. Inorganic particles of any crystal form, hardness, specific gravity and color can be used.

The average particle diameter of the above inert particles is preferably in the range of 0.05 to 5.0 μm, more preferably 0.1 to 3.0 μm. The content of the inert particles is preferably 0.001 to 1.0 wt %, more preferably 0.03 to 0.5 wt %, based on the modified PEN.

The inert particles to be added to the film may be one component or two or more components selected from the inert particles listed above.

The time at which the inert particles are added is not particularly limited as long as it is before a film is formed from a polyethylene-2,6-naphthalate copolymer. For example, the inert particles may be added in the stage of polymerization or film formation. It is also preferable that a layer containing the above inert particles be formed on the surface of the film by coating.

A primer layer may be formed on at least one side of the biaxially oriented film of the present invention to improve adhesion and slipperiness. The primer layer can be formed by coating a resin solution such as an organic solvent solution, aqueous solution or water dispersion of a synthetic resin on at least one side of the film and drying the resin solution. Inert fine particles may be contained in this resin solution in such an amount that can provide surface properties such as slipperiness when the primer layer is formed on the surface of the film.

There will be described hereunder a more preferable embodiment of the biaxially oriented film of the present invention for use as a base film for a photo film.

That is, according to the present invention, there is provided a biaxially oriented film used as a base film for a photo film, (1) which is substantially formed from a polyethylene naphthalate copolymer comprising ethylene-2,6-naphthalate units in an amount of 90 to 99.9 mol % based on the total of all recurring units and an isophthalic acid component or a decalin-2,6-dicarboxylic acid component in an amount of 0.1 to 10 mol % based on the total of all dicarboxylic acid components and which has (2) Young's modulus of 500 kg/mm² or more in each of a longitudinal direction and a transverse direction, (3) a plane orientation coefficient of 0.230 to 0.275, (4) a density of 1,350 g/cm³ or more, (5) anti-curling properties at 80° C. of 50 m⁻¹ or less in terms of ANSI curl value and (6) a delamination resistance of 10% or less in terms of folded-line delamination whitening ratio.

The biaxially oriented film suitable for use as a base film for a photo film has excellent anti-curling properties and delamination resistance.

That is, the biaxially oriented film for a photo film of the present invention has a property that it hardly remains curled when rolled once and then unrolled, that is, anti-curling properties. For example, the anti-curling properties at 80° C. of the film is 50 m⁻¹ or less, preferably 45 m⁻¹ or less, in terms of ANSI curl value. The temperature of 80° C. is an approximate value of the highest temperature to which a photo film may be possibly exposed under normal condition. If the ANSI curl value is larger than 50 m⁻¹, the handling of a photo film in the development step becomes difficult disadvantageously.

The curled photo film is evaluated based on how much curl is removed throughout a development step or a drying step for an ordinary photo film. The biaxially oriented film for a photo film and of the above ANSI curl value is not only hardly curled, that is to say, it has excellent anti-curling properties, but also easily uncurled, that is to say, it has excellent properties of removal of curling.

In the present invention, delamination resistance is expressed using folded-line delamination whitening ratio as an index. This folded-line delamination whitening ratio is defined as the ratio of the length of a whitened portion produced by folding a film to the total length of a folded portion of the film.

The delamination resistance of the biaxially oriented film for a photo film of the present invention is 10% or less, preferably 8% or less, in terms of folded-line delamination whitening ratio. If the delamination resistance is 10% or less, there can be reduced the incidence of a whitening phenomenon which occurs when the film is perforated as a base film for a photo film.

Slipperiness can be provided to the biaxially oriented film for a photo film of the present invention according to its application purpose. As means of providing slipperiness may be used a known method such as one in which lubricant particles are dispersed into a polymer or one in which a slippery layer is formed on the surface of a film.

To disperse lubricant particles into a polymer, there can be used, for example, a method in which $SiO_2$, $BaSO_4$, $CaCO_3$, alumino silicate or crosslinked organic particles are added to a polymer or a method in which a residual catalyst is separated out during the polymerization of polyethylene naphthalate.

To disperse lubricant particles into a polymer, it is preferable to add the lubricant particles to a polymer. The effect of providing slipperiness by this method is remarkable.

In this method, it is particularly preferable to add lubricant particles having a refractive index close to that of polyethylene naphthalate, such as $BaSO_4$, alumino silicate or crosslinked organic particles (for example, crosslinked polystyrene). According to this method, slipperiness can be effectively provided and the high transparency of the film can be maintained.

To form a slippery layer on the surface of a film, it is preferable to form a thin layer having lubricant particles on at least one side of a modified PEN film containing substantially no lubricant particles. A film having high slipperiness and high transparency can be obtained by this method. It is preferable to form the layer having lubricant particles by coextrusion using a plurality of extruders, a plurality of feed blocks and a multi-manifold in combination.

The modified PEN used in the biaxially oriented film for a photo film preferably comprises an isophthalic acid component in an amount of 0.5 to 8 mol %, particularly 1 to 7 mol %, or a decalin-2,6-dicarboxylic acid component in an amount of 1 to 8 mol %, particularly 1 to 7 mol %, based on the total of all dicarboxylic acid components. Modified PEN comprising an isophthalic acid component as a copolymer component is generally superior to one comprising a decalin-2,6-dicarboxylic acid component.

The above modified PEN preferably has a glass transition point (Tg) measured by a differential scanning calorimeter (DSC) of 115° C. or higher and lower than 125° C. If the glass transition point is lower than 115° C., delamination resistance is satisfactory while mechanical strength lowers disadvantageously. On the other hand, if the glass transition point is 125° C. or higher, anti-curling properties are satisfactory while mechanical strength lowers disadvantageously. Tg is more preferably 117 to 124° C., particularly preferably 118 to 123° C.

Examples

The following examples are provided for the purpose of further illustrating the present invention, although the present invention is not limited thereto. The values of properties in the examples were measured in accordance with the following methods. "Parts" in the examples means "parts by weight". Diethylene glycol may be abbreviated as DEG. Model 263-70 of Hitachi, Ltd. was used for gas chromatography.

(1) Content of Diethylene Glycol (DEG)

A polymer is decomposed using hydrazine hydrate and the content of DEG is determined by gas chromatography.

(2) Density

This is a value measured in a density gradient tube containing an aqueous solution of calcium nitrate by a sink-float method at 25° C.

(3) Surface Roughness

This is measured by the J scanner of the atomic force microscope Nano Scope III AFM of Digital Instruments Co. and expressed as Ra (square average roughness) which is measured and calculated under the following conditions.

probe: monocrystal silicon sensor scanning mode: tapping mode area to be scanned: 0.3 $\mu$m×0.3 $\mu$m (surface portion without protrusions formed by lubricant or others)

number of pixels: 256×256 data points scanning speed: 2.0 Hz measurement environment: room temperature, in the air (4) Young's Moduli A sample having a width of 10 mm and a length of 15 cm is cut out of a film and pulled by an Instron-type universal tensile tester at a chuck interval of 100 mm, a pulling rate of 10 mm/min, a chart rate of 500 mm/min, 23° C. and 50% RH. The Young's modulus in a longitudinal direction (MD) and that in a transverse direction (TD) are calculated from the tangent line of a rising portion of the obtained load-elongation curve.

(5) Plane Orientation Coefficient (NS)

The refractive index is measured using an Abbe's refractometer and sodium D rays (589 nm) as a light source and the plane orientation coefficient is obtained from the following equation.

$$NS=(nMD+nTD)/(2-nZ)$$

wherein nMD is a refractive index in a mechanical axis direction (longitudinal direction) of a biaxially oriented film, nTD is a refractive index in a direction perpendicular to the mechanical axis direction (breadthwise direction), and nZ is a refractive index in a thickness direction of the film.

(6) Number of Coarse Protrusions

A film is observed under a cross nicol at a magnification of 10 X, portions shining as fisheyes are marked, the height of each portion is measured by a two-beam interference method, and the number of protrusions of the forth or higher order, that is, protrusions having a height of 1.1 $\mu$m or more, per 100 cm$^3$ is counted and taken as the number of coarse protrusions.

(7) Folded-line Delamination Whitening Width

A film is cut to a size of 40 mm×40 mm, and the piece of the film is folded softly into two by hand, sandwiched between a pair of flat metal plates and pressed with a press at a predetermined pressure of 10 (kgf/cm$^2$) for 20 seconds. The pressed two-folded film is restored to its original state by hand and pressed at a pressure of (4 kgf/cm$^2$) for 20 seconds. Thereafter, the sample is taken out, the width ($\mu$m) of a whitened portion appearing in the fold is measured, and a mean value of a maximum value and a minimum value is taken as a folded-line delamination whitening width.

This value is used as an index indicating how easily delamination occurs. The smaller this value the less frequently the delamination occurs.

(8) Folded-line Delamination Whitening Ratio (Delamination Resistance)

A sample having a size of 80×80 mm is cut out of a film, and the sample is folded softly into two by hand, sandwiched between a pair of flat metal plates and pressed with a press at a predetermined pressure P1 (kg/cm$^2$G) for 20 seconds. The pressed two-folded film sample is restored to its original state by hand, sandwiched between the above metal plates and pressed at a pressure P1 (kg/cm$^2$G) for 20 seconds. Thereafter, the film sample is taken out, the length of each whitened portion appearing in the fold is measured, and all the measurement values are totaled.

New film samples are used to repeat the above measurement at a pressure P1=1, 2, 3, 4, 5 and 6 (kg/cm$^2$G).

The ratio (%) of the mean value of the total values of the lengths (mm) of whitened portions at different pressures to the total length (80 mm) of the fold is taken as a folded-line delamination whitening ratio (%) and this value is used as an index indicating how rarely delamination occurs (delamination resistance).

(9) Anti-curling Properties (ANSI Curl Value)

A film sample having a size of 120×25 mm is left to stand in a flat state at 23° C. and 50% RH for 24 hours, wound around a core having a diameter of 7 mm in a longitudinal direction, fixed provisionally to prevent it from rewinding, heated at 80° C. for 2 hours and then released from the core. Thereafter, the film sample is immersed in distilled water of 40° C. for 15 minutes, hung with its longitudinal direction perpendicular and heated to dry in an air isothermal tank at 55° C. under a load of 33.5 g for 3 minutes.

The curled sample is measured in accordance with the test method A of ANSI PH 1.29-1971, and a curl value is calculated by converting inches into meters and used as an index of anti-curling properties.

(10) Intrinsic Viscosity

This is measured in a mixed solvent of phenol and tetrachloroethane (weight ratio of 6:4) at 35° C.

Example 1

Ninety nine parts of dimethyl naphthalene-2,6-dicarboxylate, 0.8 part (1 mol % based on the total weight of all dicarboxylic acid components) of dimethyl isophthalate and 60 parts of ethylene glycol were subjected to an ester interchange reaction in the presence of 0.03 part of manganese acetate tetrahydrate as an ester interchange catalyst and by adding 0.005 wt % of silica particles having an average particle diameter of 0.3 μm as a lubricant in accordance with a commonly used method. The ester interchange reaction was substantially terminated by adding 0.023 part of trimethyl phosphate.

Thereafter, 0.024 part of antimony trioxide was added and a polymerization reaction was subsequently carried out at a high temperature and a highly reduced pressure in accordance with a commonly used method to give a polyethylene-2,6-naphthalate copolymer having a DEG content of 1.1 mol % and an intrinsic viscosity of 0.61 dl/g.

The pellets of this polyethylene-2,6-naphthalate copolymer were dried at 170° C. for 6 hours, supplied to the hopper of an extruder, molten at a temperature of 310° C., and extruded onto a rotary cooling drum having a surface temperature of 60° C. through a 1-mm slit die to be quenched to give an unstretched film. The thus obtained unstretched film was preheated at 120° C., stretched to 3.6 times in a longitudinal direction between low-speed and high-speed rolls while heated with an IR heater at 900° C. 15 mm above the rolls, and then supplied to a tenter to be stretched to 3.9 times in a transverse direction at 140° C. The obtained biaxially oriented film was heat-set at 220° C. for 5 seconds and relaxed breadthwise by 0.5% at a temperature of 190° C. to give a 10-μm-thick biaxially oriented film. This biaxially oriented film was heated, contacted to a cooling roll to be quenched with graspers in its transverse direction removed and with the tension in a longitudinal direction maintained, and then wound round a roll. The obtained film had satisfactory properties as shown in Table 1.

Example 2

A biaxially oriented film was obtained in the same manner as in Example 1 except that the amount of dimethyl isophthalate to be copolymerized was changed to 5 mol %. The obtained film had satisfactory properties as shown in Table 1.

Example 3

A biaxially oriented film was obtained in the same manner as in Example 1 except that the amount of dimethyl isophthalate to be copolymerized was changed to 7 mol % and the heat-setting temperature was changed to 210° C. The obtained film had satisfactory properties as shown in Table 1.

Example 4

A biaxially oriented film was obtained in the same manner as in Example 1 except that the stretch ratio in a longitudinal direction was changed to 4.7 times and that in a transverse direction was changed to 5.1 times. The obtained film had satisfactory properties as shown in Table 1.

Comparative Example 1

A biaxially oriented film was obtained in the same manner as in Example 1 except that dimethyl isophthalate was not copolymerized. The physical properties of the obtained film are shown in Table 1. The obtained film was inferior in delamination resistance.

Comparative Example 2

A biaxially oriented film was obtained in the same manner as in Example 1 except that 99 parts of dimethyl terephthalate as a dicarboxylic acid component, 1 part of dimethyl isophthalate (1 mol % based on the total of all dicarboxylic acid components) and 60 parts of ethylene glycol as a glycol component were used. The physical properties of the obtained film are shown in Table 1. Although the obtained film was superior in delamination resistance, it was inferior in Young's moduli because naphthalenedicarboxylic acid was not used as a main dicarboxylic acid component.

Comparative Example 3

A biaxially oriented film was obtained in the same manner as in Example 1 except that 2.5 parts of diethylene glycol (abbreviated as DEG) was added. The physical properties of the obtained film are shown in Table 1. The obtained film was satisfactory in terms of delamination resistance but unsatisfactory in terms of Young's moduli.

Comparative Example 4

A biaxially oriented film was obtained in the same manner as in Example 1 except that 1 mol % of dimethyl terephthalate was copolymerized in place of dimethyl isophthalate. The physical properties of the obtained film are shown in Table 1. The obtained film was unsatisfactory in terms of Young's moduli.

Comparative Example 5

A biaxially oriented film was obtained in the same manner as in Example 1 except that 1 mol % of neopentyl glycol was copolymerized in place of dimethyl isophthalate. The physical properties of the obtained film are shown in Table 1. The obtained film was unsatisfactory in terms of Young's moduli.

Comparative Example 6

A biaxially oriented film was obtained in the same manner as in Example 1 except that 1 mol % of cyclohexanedimethanol was copolymerized in place of dimethyl isophthalate. The physical properties of the obtained film are shown in Table 2. The obtained film was unsatisfactory in terms of Young's moduli.

Comparative Example 7

A biaxially oriented film was obtained in the same manner as in Example 1 except that 1 mol % of a bisphenol A adduct with 2 moles of ethylene oxide was copolymerized in place of dimethyl isophthalate. The physical properties of the obtained film are shown in Table 2. The obtained film was unsatisfactory in terms of Young's moduli.

Comparative Example 8

A biaxially oriented film was obtained in the same manner as in Example 1 except that 1 mol % of a bisphenol sulfone adduct with 2 moles of ethylene oxide was copolymerized in place of dimethyl isophthalate. The physical properties of the obtained film are shown in Table 2. The obtained film was unsatisfactory in terms of Young's moduli.

Comparative Example 9

A biaxially oriented film was obtained in the same manner as in Example 1 except that the temperature of a rotary cooling drum for extruding an unstretched film was changed to 90° C. and the heat-setting temperature was changed to 265° C. The physical properties of the obtained film are shown in Table 2. The obtained film had a rough surface and was unsatisfactory in terms of Young's moduli.

Abbreviations in Tables 1 and 2 stand for the following components.

NDC: dimethyl naphthalene-2,6-dicarboxylate
EG: ethylene glycol
DMI: dimethyl isophthalate
DEG: diethylene glycol
DMT: dimethyl terephthalate NPG: neopentyl glycol
BPA-EO: bisphenol A adduct with ethylene oxide
BPS-EO: bisphenol sulfone adduct with ethylene oxide
CHDM: 1,4-cyclohexanedimethanol

TABLE 1

|  |  | Example.1 | Example.2 | Example.3 | Example.4 |
|---|---|---|---|---|---|
| polymer composition |  |  |  |  |  |
| main acid component |  | NDC | NDC | NDC | NDC |
| quantity | mol % | 99 | 95 | 93 | 99 |
| copolymer component |  | DMI | DMI | DMI | DMI |
| quantity | mol % | 1 | 5 | 7 | 1 |
| quantity of DEG | mol % | 1.1 | 1.2 | 1.3 | 1.1 |
| film-forming conditions |  |  |  |  |  |
| stretch ratio in longitutinal direction | times | 3.6 | 3.6 | 3.6 | 4.7 |
| stretch ratio in transverse direction | times | 3.9 | 3.9 | 3.9 | 5.1 |
| heat-setting temperature | ° C. | 220 | 220 | 210 | 220 |
| physical properties |  |  |  |  |  |
| thickness | μm | 10 | 10 | 10 | 10 |
| density | g/cm$^2$ | 1.356 | 1.355 | 1.353 | 1.357 |
| Young's moduli MD | kg/mm$^2$ | 630 | 630 | 620 | 670 |
| TD | kg/mm$^2$ | 630 | 610 | 605 | 640 |
| plane orientation coefficient |  | 0.258 | 0.239 | 0.231 | 0.266 |
| surface roughness | nm | 1.5 | 1.6 | 1.7 | 1.1 |
| number of coarse protrusions | per 100 cm$^2$ | 0 | 0 | 0 | 0 |
| folded-line delamination whitening width | μm | 30 | 27 | 25 | 32 |

|  |  | Comp.Ex.1 | Comp.Ex.2 | Comp.Ex.3 | Comp.Ex.4 | Comp.Ex.5 |
|---|---|---|---|---|---|---|
| polymer composition |  |  |  |  |  |  |
| main acid component |  | NDC | DMT | NDC | NDC | EG |
| quantity | mol % | 100 | 99 | 99 | 99 | 99 |
| copolymer component |  | — | DMI | DMI | DMT | NPG |
| quantity | mol % | — | 1 | 1 | 1 | 1 |
| quantity of DEG | mol % | 1.1 | 1.2 | 5.0 | 1.2 | 1.1 |
| film-forming conditions |  |  |  |  |  |  |
| stretch ratio in longitutinal direction | times | 3.6 | 3.6 | 3.6 | 3.6 | 3.6 |
| stretch ratio in transverse direction | times | 3.9 | 3.9 | 3.9 | 3.9 | 3.9 |
| heat-setting temperature | ° C. | 220 | 220 | 220 | 220 | 220 |
| physical properties |  |  |  |  |  |  |
| thickness | μm | 10 | 10 | 10 | 10 | 10 |
| density | g/cm$^2$ | 1.356 | 1.385 | 1.346 | 1.353 | 1.354 |
| Young's moduli MD | kg/mm$^2$ | 630 | 510 | 520 | 580 | 580 |
| TD | kg/mm$^2$ | 630 | 500 | 530 | 580 | 580 |
| plane orientation coefficient |  | 0.261 | 0.150 | 0.220 | 0.240 | 0.241 |
| surface roughness | nm | 1.2 | 1.8 | 2.5 | 1.5 | 1.6 |
| number of coarse protrusions | per 100 cm$^2$ | 0 | 0 | 0 | 0 | 0 |
| folded-line delamination whitening width | μm | 34 | 20 | 29 | 30 | 31 |

Comp.Ex.: Comparative Example

TABLE 2

|  |  | Comp.Ex.6 | Comp.Ex.7 | Comp.Ex.8 | Comp.Ex.9 |
|---|---|---|---|---|---|
| polymer composition |  |  |  |  |  |
| main acid component |  | EG | EG | EG | NDC |
| quantity | mol % | 99 | 99 | 99 | 99 |
| copolymer component |  | CHDM | BPA-EO | BPS-EO | DMI |
| quantity | mol % | 1 | 1 | 1 | 1 |
| quantity of DEG | mol % | 1.1 | 1.2 | 1.1 | 1.1 |
| film-forming conditions |  |  |  |  |  |
| stretch ratio in longitutinal direction | times | 3.6 | 3.6 | 3.6 | 3.6 |
| stretch ratio in transverse direction | times | 3.9 | 3.9 | 3.9 | 3.9 |
| heat-setting temperature | °C. | 220 | 220 | 220 | 260 |
| physical properties |  |  |  |  |  |
| thickness | μm | 10 | 10 | 10 | 10 |
| density | g/cm$^2$ | 1.351 | 1.351 | 1.352 | 1.364 |
| Young's moduli MD | kg/mm$^2$ | 530 | 530 | 540 | 530 |
| TD | kg/mm$^2$ | 540 | 550 | 550 | 540 |
| plane orientation coefficient |  | 0.232 | 0.231 | 0.233 | 0.225 |
| surface roughness | nm | 1.8 | 1.8 | 1.7 | 5.1 |
| number of coarse protrusions | per 100 cm$^2$ | 0 | 0 | 0 | 0 |
| folded-line delamination whitening width | μm | 29 | 29 | 29 | 29 |

Comp.Ex.: Comparative Example

Example 5

Ninety nine parts of dimethyl naphthalene-2,6-dicarboxylate, 1.04 part of dimethyl decalin-2,6-dicarboxylate (1 mol % based on the total weight of all dicarboxylic acid components) and 60 parts of ethylene glycol were subjected to an ester interchange reaction in the presence of 0.03 part of manganese acetate tetrahydrate as an ester interchange catalyst and by adding 0.03 part of silica particles having an average particle diameter of 0.3 μm as a lubricant in accordance with a commonly used method. The ester interchange reaction was substantially terminated by adding 0.023 part of trimethyl phosphate.

Thereafter, 0.024 part of antimony trioxide was added and a polymerization reaction was subsequently carried out at a high temperature and a highly reduced pressure in accordance with a commonly used method to give a polyethylene-2,6-naphthalate copolymer having an intrinsic viscosity of 0.61 dl/g and a DEG content of 1.1 mol %.

The pellets of this polyethylene-2,6-naphthalate copolymer were dried at 170° C. for 6 hours, supplied to the hopper of an extruder, molten at a temperature of 310° C. and extruded onto a rotary cooling drum having a surface temperature of 60° C. through a 1-mm slit die to be quenched to give an unstretched film. The thus obtained unstretched film was preheated at 120° C., stretched to 3.6 times in a longitudinal direction between low-speed and high-speed rolls while heated with an IR heater at 900° C. 15 mm above the rolls, and then supplied to a tenter to be stretched to 3.9 times in a transverse direction at 140° C. The obtained biaxially oriented film was heat-set at 220° C. for 5 seconds and relaxed breadthwise by 0.5% at a temperature of 190° C. to give a 10-μm-thick biaxially oriented film. This biaxially oriented film was heated, contacted to a cooling roll to be quenched with graspers in its transverse direction removed and with the tension in a longitudinal direction maintained, and then wound round a roll to give a polyethylene-2,6-naphthalate copolymer film. The obtained film had satisfactory properties as shown in Table 3.

Example 6

A biaxially oriented film was obtained in the same manner as in Example 5 except that the amount of dimethyl decalin-2,6-dicarboxylate was changed from 1.04 part to 5.2 parts (5 mol % based on the total weight of all dicarboxylic acid components). The obtained film had satisfactory properties as shown in Table 3.

Example 7

A biaxially oriented film was obtained in the same manner as in Example 5 except that the amount of dimethyl decalin-2,6-dicarboxylate was changed from 1.04 part to 7.29 parts (7 mol % based on the total weight of all dicarboxylic acid components) and the heat-setting temperature was changed from 220° C. to 210° C. The obtained film had satisfactory properties as shown in Table 3.

Example 8

A biaxially oriented film was obtained in the same manner as in Example 5 except that the stretch ratio in a longitudinal direction was changed to 4.7 times and that in a transverse direction was changed to 5.1 times. The obtained film had satisfactory properties as shown in Table 3.

Comparative Example 10

A biaxially oriented film was obtained in the same manner as in Example 5 except that 2.5 parts of diethylene glycol (abbreviated as DEG) was added as a diol component, in addition to 60 parts of ethylene glycol. The obtained film was unsatisfactory in terms of Young's moduli as shown in Table 3.

Comparative Example 11

A biaxially oriented film was obtained in the same manner as in Example 5 except that the temperature of a rotary cooling drum for extruding an unstretched film was changed to 90° C. and the heat-setting temperature was changed to 260° C. The obtained film had a rough surface and was unsatisfactory in terms of Young's moduli as shown in Table 3.

the unstretched film were adjusted to ensure that the total of Young's moduli (MD+TD) should fall within the range of 1,000 to 1,200 kg/mm² and that the thickness of the stretched film should become 75 μm.

TABLE 3

|  | Unit | Ex.5 | Ex.6 | Ex.7 | Ex.8 | C.Ex.10 | C.Ex.11 |
|---|---|---|---|---|---|---|---|
| polymer composition |  |  |  |  |  |  |  |
| acid component copolymerized |  | DDC | DDC | DDC | DDC | DDC | DDC |
| quantity | mol % | 1 | 5 | 7 | 1 | 1 | 1 |
| quantity of DEG | mol % | 1.1 | 1.2 | 1.3 | 1.1 | 5 | 1.1 |
| film-forming conditions |  |  |  |  |  |  |  |
| stretch ratio in longitutinal direction | times | 3.6 | 3.6 | 3.6 | 4.7 | 3.6 | 3.6 |
| stretch ratio in transverse direction | times | 3.9 | 3.9 | 3.9 | 5.1 | 3.9 | 3.9 |
| heat-setting temperature | ° C. | 220 | 220 | 210 | 220 | 220 | 260 |
| physical properties |  |  |  |  |  |  |  |
| thickness | μm | 10 | 10 | 10 | 10 | 10 | 10 |
| density | g/cm³ | 1.353 | 1.350 | 1.348 | 1.355 | 1.346 | 1.362 |
| Young's moduli MD | kg/mm² | 620 | 605 | 610 | 630 | 520 | 540 |
| Young's moduli TD | kg/mm² | 630 | 610 | 610 | 640 | 530 | 550 |
| plane orientation coefficient |  | 0.254 | 0.243 | 0.241 | 0.261 | 0.228 | 0.229 |
| surface roughness | nm | 1.6 | 1.7 | 1.8 | 1.2 | 2.5 | 5.2 |
| number of coarse protrusions | per 100 cm² | 0 | 0 | 0 | 0 | 0 | 0 |
| folded-line delamination whitening width | μm | 28 | 27 | 26 | 30 | 28 | 28 |

Ex.: Example; C.Ex.: Comparative Example
DDC: dimethyl decalin-2,6-dicarboxylate
DEG: diethylene glycol

Example 9

Ninety eight parts of dimethyl naphthalene-2,6-dicarboxylate and 60 parts of ethylene glycol were subjected to an ester interchange reaction in the presence of 0.03 part of manganese acetate tetrahydrate as an ester interchange catalyst in accordance with a commonly used method. The ester interchange reaction was substantially terminated by adding 0.023 part of trimethyl phosphate.

Thereafter, 0.024 part of antimony trioxide and 1.36 part (2 mol % based on the total weight of all dicarboxylic acid components) of isophthalic acid were added, and the resulting mixture was allowed to react at a high temperature and normal pressure for 5 minutes. Subsequently, a polycondensation reaction was carried out at a high temperature and a highly reduced pressure in accordance with a commonly used method to give a polyethylene naphthalate copolymer having an intrinsic viscosity of 0.62 dl/g and a DEG content of 1.3 mol %.

The pellets of this polyethylene naphthalate copolymer were dried at 180° C. for 3 hours, supplied to the hopper of an extruder, molten at a temperature of 300° C. and extruded onto a rotary cooling drum having a surface temperature of 40° C. through a 1-mm slit die to give an unstretched film. The thus obtained unstretched film was preheated at 120° C., stretched to 2.9 times in a longitudinal direction between low-speed and high-speed rolls while heated with an IR heater at 900° C. 15 mm above the rolls, and then supplied to a tenter to be stretched to 3.1 times in a transverse direction at 140° C. The obtained biaxially oriented film was heat-set at 210° C. for 5 seconds to give a 75-μm-thick polyethylene naphthalate copolymer film. The stretch ratios in longitudinal and transverse directions and the thickness of The properties of the obtained film were measured after it had been heated at 110° C. for 2 days. It had satisfactory properties as a base film for a photo film.

Examples 10 and 11

Biaxially oriented films were obtained in the same manner as in Example 9 except that the amounts of dimethyl naphthalene-2,6-dicarboxylate and isophthalic acid were changed as shown in Table 4. The properties of the obtained films are shown in Table 4. The obtained films had satisfactory properties as a base film for a photo film as did the film obtained in Example 9.

Comparative Example 12

A biaxially oriented film was obtained in the same manner as in Example 9 except that a polyethylene-2,6-naphthalate homopolymer was produced using 100 parts of dimethyl naphthalene-2,6-dicarboxylate and without adding isophthalic acid. The properties of the obtained film are shown in Table 4. The obtained film was unsatisfactory in terms of delamination resistance.

Comparative Example 13

A biaxially oriented film was obtained in the same manner as in Example 9 except that 2 part of DEG was added. The content of DEG in the copolyester was 4.2 mol %.

When the content of DEG was more than 3 mol %, the obtained film was unsatisfactory in terms of delamination resistance and anti-curling properties even if the same amount of an isophthalic aid component as that of Example 9 was copolymerized.

TABLE 4

|       | content of NDC (mol %) | content of IA (mol %) | content of DEG (mol %) | intrinsic viscosity | delamination whitening ratio (%) | anti-curling properties (ANSI curl value) m$^{-1}$ | Young's moduli MD/TD kg/mm$^2$ |
|-------|------|------|------|------|----|----|---------|
| Ex.9   | 98  | 2.0 | 1.3 | 0.62 | 4  | 26 | 565/593 |
| Ex.10  | 99  | 1.0 | 1.4 | 0.63 | 7  | 24 | 586/607 |
| Ex.11  | 97  | 2.9 | 1.4 | 0.61 | 2  | 29 | 547/571 |
| C.Ex.12| 100 | 0   | 1.3 | 0.62 | 24 | 22 | 590/609 |
| C.Ex.13| 98  | 2.0 | 4.2 | 0.64 | 18 | 51 | 561/566 |

Ex.: Example; C.Ex.: Comparative Example
NDC: dimethyl naphthalene-2,6-dicarboxylate
IA: isophthalic acid
DEG: diethylene glycol

Example 12

Ninety seven parts of dimethyl naphthalene-2,6-dicarboxylate, 3.12 parts (3 mol % based on the total weight of all dicarboxylic acid components) of dimethyl decalin-2,6-dicarboxylate and 60 parts of ethylene glycol were subjected to an ester interchange reaction in the presence of 0.03 part of manganese acetate tetrahydrate as an ester interchange catalyst in accordance with a commonly used method. The ester interchange reaction was substantially terminated by adding 0.023 part of trimethyl phosphate.

Thereafter, 0.024 part of antimony trioxide was added, and a polycondensation reaction was then carried out at a high temperature and a highly reduced pressure in accordance with a commonly used method to give a polyethylene naphthalate copolymer having an intrinsic viscosity of 0.61 dl/g and a DEG content of 1.2 mol %.

The pellets of this polyethylene naphthalate copolymer were dried at 180° C. for 3 hours, supplied to the hopper of an extruder, molten at a temperature of 300° C. and extruded onto a rotary cooling drum having a surface temperature of 40° C. through a 1-mm slit die to be quenched to give an unstretched film. The thus obtained unstretched film was preheated at 120° C., stretched to 3.0 times in a longitudinal direction between low-speed and high-speed rolls while heated with an IR heater at 900° C. 15 mm above the rolls, and then supplied to a tenter to be stretched to 3.3 times in a transverse direction at 140° C. The obtained biaxially oriented film was heat-set at 210° C. for 5 seconds to give a 75-μm-thick polyethylene naphthalate copolymer film.

The properties of the obtained film were measured after it had been heated at 110° C. for 2 days. It had satisfactory properties as a base film for a photo film as shown in Table 5.

Examples 13 to 15

Biaxially oriented films were obtained in the same manner as in Example 12 except that the amounts of dimethyl naphthalene-2,6-dicarboxylate and dimethyl decalin-2,6-dicarboxylate were changed as shown in Table 5. The properties of the obtained films are shown in Table 5. The obtained films had satisfactory properties as a base film for a photo film as did the film obtained in Example 12.

Comparative Examples 14 and 15

Biaxially oriented films were obtained in the same manner as in Example 12 except that the amounts of dimethyl naphthalene-2,6-dicarboxylate and dimethyl decalin-2,6-dicarboxylate were changed as shown in Table 5, that is, to more than 10 mol %. The properties of the obtained films are shown in Table 5. The obtained films were satisfactory in terms of delamination resistance but not in terms of Young's moduli and properties of removal of curling.

Comparative Example 16

A biaxially oriented film was obtained in the same manner as in Example 12 except that 2 parts of DEG were added. The content of DEG in the copolyester was 4.2 mol %. When the content of DEG was more than 3 mol %, the obtained film was unsatisfactory in terms of Young's moduli and properties of removal of curling even if the same amount of decalin-2,6-dicarboxylic acid component as that of Example 12 was copolymerized.

TABLE 5

|        | content of NDC (mol %) | content of DDC (mol %) | content of DEG (mol %) | intrinsic viscosity | delamination whitening ratio (%) | anti-curling properties (ANSI curl value) m$^{-1}$ | Young's moduli MD/TD kg/mm$^2$ |
|--------|------|-----|-----|------|---|----|---------|
| Ex.12   | 97   | 3   | 1.1 | 0.63 | 2 | 31 | 584/595 |
| Ex.13   | 95   | 5   | 1.2 | 0.62 | 1 | 34 | 555/570 |
| Ex.14   | 93   | 7   | 1.3 | 0.63 | 0 | 40 | 530/549 |
| Ex.15   | 98.5 | 1.5 | 1.2 | 0.62 | 4 | 26 | 597/615 |
| C.Ex.14 | 88   | 12  | 1.4 | 0.64 | 0 | 63 | 470/480 |
| C.Ex.15 | 85   | 15  | 1.3 | 0.63 | 0 | 67 | 456/470 |
| C.Ex.16 | 97   | 3   | 4.2 | 0.65 | 0 | 61 | 481/493 |

Ex.: Example; C.Ex.: Comparative Example
NDC: dimethyl naphthalene-2,6-dicarboxylate
DDC: dimethyl decalin-2,6-dicarboxylate
DEG: diethylene glycol

What is claimed is:

1. A biaxially oriented film (1) which is substantially formed from a polyethylene naphthalate copolymer comprising ethylene-2,6-naphthalate units in an amount of 90 to 99.9 mol % based on the total of all recurring units and an isophthalic acid component or a decalin-2,6-dicarboxylic acid component in an amount of 0.1 to 10 mol % based on the total of all dicarboxylic acid components and which has (2) Young's modulus of 500 kg/mm² or more in each of a longitudinal direction and a transverse direction, (3) a plane orientation coefficient of 0.230 to 0.275 and (4) a density of 1.350 g/cm³ or more.

2. The biaxially oriented film of claim 1, which is substantially formed from a polyethylene naphthalate copolymer comprising a diethylene glycol component in an amount of 3 mol % or less based on the total of all dicarboxylic acid components.

3. The biaxially oriented film of claims 1 or 2, which has (5) anti-curling property at 80° C. of 50 m⁻¹ in terms of ANSI curl value.

4. The biaxially oriented film of claims 1 or 2, which has (6) a delamination resistance of 10% or less in terms of folded-line delamination whitening ratio.

5. The biaxially oriented film of claim 1, which is substantially formed from a polyethylene naphthalate copolymer comprising an isophthalic acid component in an amount of 0.5 to 8 mol % based on the total of all dicarboxylic acid components.

6. The biaxially oriented film of claim 1, which is substantially formed from a polyethylene naphthalate copolymer comprising a decalin-2,6-dicarboxylic acid component in an amount of 1 to 8 mol % based on the total of all dicarboxylic acid components.

7. The biaxially oriented film of claim 1, which has a thickness of 0.5 to 250 µm.

8. A biaxially oriented film used as a base film for a magnetic recording medium, (1) which is substantially formed from a polyethylene naphthalate copolymer comprising ethylene-2,6-naphthalate units in an amount of 90 to 99.9 mol % based on the total of all recurring units and an isophthalic acid component or a decalin-2,6-dicarboxylic acid component in an amount of 0.1 to 10 mol % based on the total of all dicarboxylic acid components and which has (2) Young's modulus of 500 kg/mm² or more in each of a longitudinal direction and a transverse direction with the total of Young's moduli in both directions being 1,200 kg/mm² or more, (3) a plane orientation coefficient of 0.230 to 0.275, (4) a density of 1.350 g/cm³ or more, and (5) a film surface roughness of 2.0 nm or less.

9. The biaxially oriented film of claim 8, which is substantially formed from a polyethylene naphthalate copolymer comprising a diethylene glycol component in an amount of 3 mol % or less based on the total of all dicarboxylic acid components.

10. The biaxially oriented film of claim 8, which has coarse protrusions having a height of 1.1 µm or more on the surface at a density of 5 or less per 100 cm².

11. The biaxially oriented film of claim 8, which has a thickness of 1 to 25 µm.

12. The biaxially oriented film of claim 8, which is substantially formed from a polyethylene naphthalate copolymer comprising an isophthalic acid component in an amount of 0.5 to 8 mol % based on the total of all dicarboxylic acid components.

13. The biaxially oriented film of claim 8, which is substantially formed from a polyethylene naphthalate copolymer comprising a decalin-2,6-dicarboxylic acid component in an amount of 1 to 8 mol % based on the total of all dicarboxylic acid components.

14. The biaxially oriented film of claim 8, which has Young's moduli in both longitudinal and transverse directions of 1,200 kg/mm² in total.

15. A biaxially oriented film used as a base film for a photo film, (1) which is substantially formed from a polyethylene naphthalate copolymer comprising ethylene-2,6-naphthalate units in an amount of 90 to 99.9 mol % based on the total of all recurring units and an isophthalic acid component or a decalin-2,6-dicarboxylic acid component in an amount of 0.1 to 10 mol % based on the total of all dicarboxylic acid components and which has (2) Young's modulus of 500 kg/mm² or more in each of a longitudinal direction and a transverse direction, (3) a plane orientation coefficient of 0.230 to 0.275, (4) a density of 1.350 g/cm³ or more, (5) anti-curling property at 80° C. of 50 m⁻¹ or less in terms of ANSI curl value and (6) a delamination resistance of 10% or less in terms of folded-line delamination whitening ratio.

16. The biaxially oriented film of claim 15, which is substantially formed from a polyethylene naphthalate copolymer comprising a diethylene glycol component in an amount of 3 mol % or less based on the total of all dicarboxylic acid components.

17. The biaxially oriented film of claim 15, which has a thickness of 25 to 250 µm.

18. The biaxially oriented film of claim 15, which has anti-curling property at 80° C. of 45 m⁻¹ or less in terms of ANSI curl value.

19. The biaxially oriented film of claim 15, which has a delamination resistance of 8 or less in terms of folded-line delamination whitening ratio.

20. The biaxially oriented film of claim 15, which is substantially formed from a polyethylene naphthalate copolymer having a glass transition temperature (Tg) of 115 to 125° C.

21. The biaxially oriented film of claim 15, which is substantially formed from a polyethylene naphthalate copolymer comprising an isophthalic acid component in an amount of 0.5 to 8 mol % based on the total of all dicarboxylic acid components.

22. The biaxially oriented film of claim 15, which is substantially formed from a polyethylene naphthalate copolymer comprising a decalin-2,6-dicarboxylic acid component in an amount of 1 to 8 mol % based on the total of all dicarboxylic acid components.

23. A magnetic recording medium having a magnetic recording layer on one side of the film of claim 8.

24. A composite film having a primer layer formed on at least one side of the biaxially oriented film of claim 15.

25. A photo film having a photosensitive layer formed on one side of the film of claim 15 or 24.

26. The biaxially oriented film of claim 3, which has (6) a delamination resistance of 10% or less in terms of folded-line delamination whitening ratio.

* * * * *